United States Patent [19]

Byron

[11] Patent Number: 4,720,684

[45] Date of Patent: Jan. 19, 1988

[54] OPTICAL AMPLIFIER

[75] Inventor: Kevin C. Byron, Bishops Stortford, United Kingdom

[73] Assignee: Standard Telephones and Cables plc, London, England

[21] Appl. No.: 888,274

[22] Filed: Jul. 22, 1986

Related U.S. Application Data

[63] Continuation of Ser. No. 679,444, Dec. 7, 1984, abandoned.

[30] Foreign Application Priority Data

Dec. 16, 1983 [GB] United Kingdom ............... 83 33610

[51] Int. Cl.$^4$ ........................... H07F 7/00; H04B 9/00
[52] U.S. Cl. ..................................... 330/4.3; 307/426; 455/612
[58] Field of Search ..................................... 372/9, 75

[56] References Cited

U.S. PATENT DOCUMENTS

| | | | |
|---|---|---|---|
| 3,290,539 | 12/1966 | Lamorte | 372/75 |
| 3,705,992 | 12/1972 | Ippen et al. | 455/610 |
| 3,873,825 | 3/1975 | Jones et al. | 455/610 |
| 4,389,617 | 6/1983 | Kurnit | 330/4.3 |
| 4,394,623 | 7/1983 | Kurnit | 330/4.3 |
| 4,401,364 | 8/1983 | Mochizuki | 350/96.16 |
| 4,515,431 | 5/1985 | Shaw et al. | 350/96.15 |

FOREIGN PATENT DOCUMENTS 2116391 9/1983 United Kingdom .
2077909 6/1984 United Kingdom .

Primary Examiner—Nelson Moskowitz
Attorney, Agent, or Firm—Kerkam, Stowell, Kondracki & Clarke

[57] ABSTRACT

Use is made of stimulated Raman emission to induce gain in an optical signal (13) of a first wavelength. The optical signal (13) and a pump signal (14) are synchronously coupled to a length of optical fibre (15). The pump signal is at a second wavelength. The first wavelength corresponds to one Stokes shift from the pump signal. The pump signal is generated by a semiconductor laser (11) and thus only relatively low pump powers are involved in comparison with the conventional use of YAG lasers as the pumps, however significant gain is achieved despite the low pump powers. Preferably the optical fibre (15) has a high Raman cross-section and a low transmission loss, for example GeO$_2$ doped SiO$_2$ or pure GeO$_2$.

9 Claims, 4 Drawing Figures

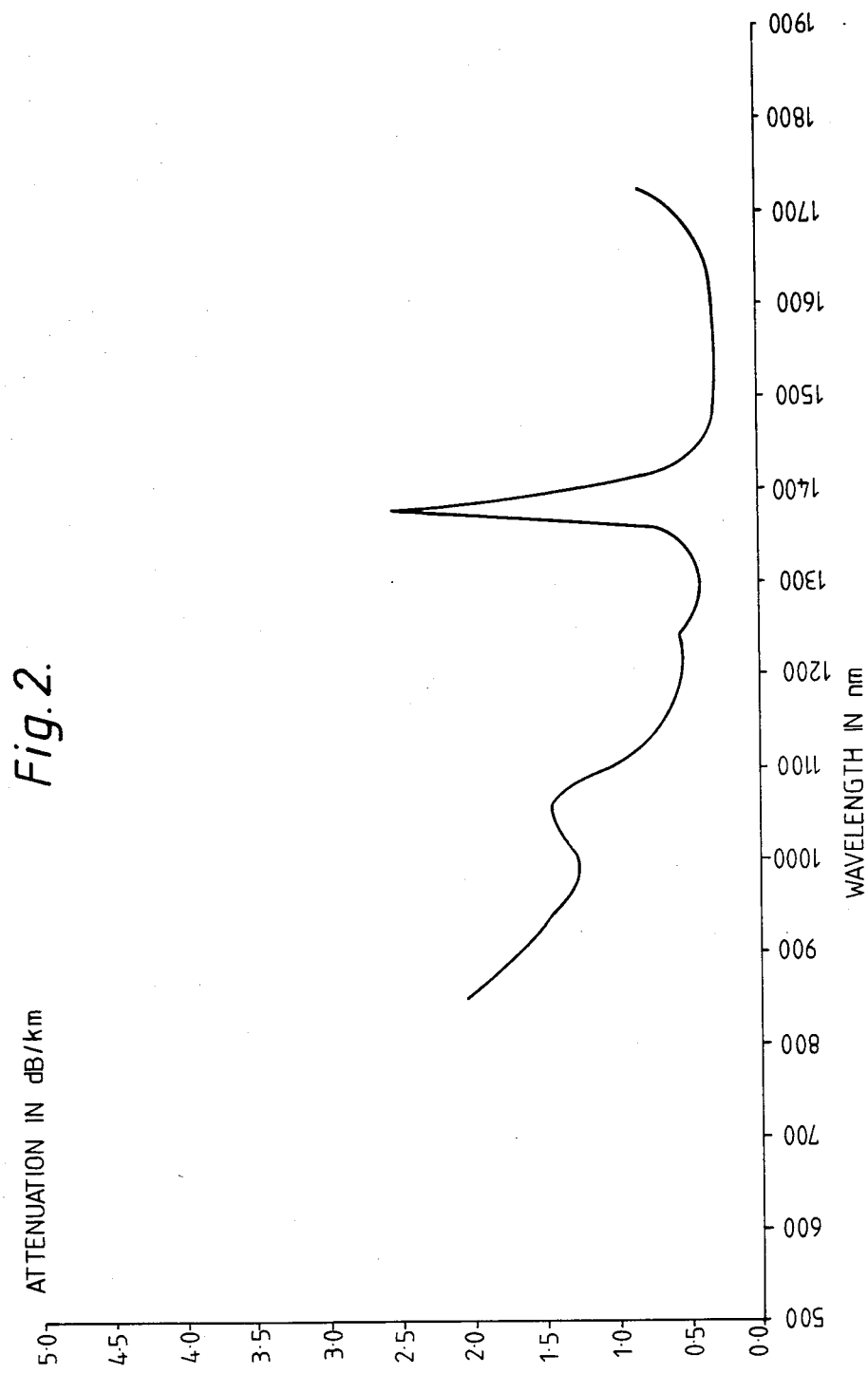

OPTICAL AMPLIFIER

This is a continuation of application Ser. No. 679,444, filed Dec. 7, 1984, now abandoned.

BACKGROUND OF THE INVENTION

This invention relates to optical amplifiers, and in particular to means and methods for amplifying an optical signal without having to convert it to an electrical signal.

SUMMARY OF THE INVENTION

According to one aspect of the invention there is provided an optical amplifier comprising a length of optical fibre; a semiconductor laser and drive means therefor, the output of the semiconductor laser comprising a pulsed pump signal; and coupler means having an input for an optical signal, of a first wavelength, to be amplified, an input for the pump signal and an output coupled to an input end of the optical fibre, and wherein in use the fibre is optically pumped by the pump signal at a second wavelength and gain is obtained at the first wavelength in the signal to be amplified, which first wavelength corresponds to one or more Stokes shift from the pump signal.

According to another aspect of the present invention there is provided a method of amplifying a first optical signal of a first wavelength comprising the steps of generating a pulsed pump signal at a second wavelength by means of a semiconductor laser, and synchronously coupling the first optical signal and the pump signal into a length of optical fibre, the first wavelength corresponding to one Stokes shift from the pump signal wavelength, Raman stimulated emission in the optical fibre serving to induce gain in the first optical signal.

BRIEF DESCRIPTION OF THE DRAWINGS

Embodiments of the invention will now be described with reference to the accompanying drawings, in which:

FIG. 2 shows the loss curve for a $GeO_2$ doped $SiO_2$ single mode optical fibre;

DESCRIPTION OF THE PREFERRED EMBODIMENTS

Stimulated Raman scattering in low loss optical fibre waveguides has attracted considerable attention owing to the high efficiency of generation of multiple Stokes frequency shifts. This effect has been utilised to provide a pulsed tunable source for fibre diagnostic measurements (Cohen L. G. and Lin C., "A universal fibre optical (UFO) measurement system based on a new IR fibre Raman laser" IEEE J. Quantum Electron., 1979, 14, p 855) but the direct application of this mechanism for producing amplification of the transmitted signal in a fibre has only recently been investigated. Results have been obtained showing substantial amplification in $GeO_2$ doped $SiO_2$ fibres at 1.064 micron (Ikeda M., "Stimulated Raman amplification characteristics in long span single mode silica fibres." Optics Communications 1981, Vol 39 No 3 p 148), 1.24 micron (Desurvire E., Papuchon M., Pocholle J. P. and Raffy J., "High-gain Optical amplification of laser diode signal by Raman scattering in single-mode fibres." Electronics Letters 1983, Vol 19, 19 p 751) and 1.4 micron (Aoki Y. Kishida S., Honmon H., Washio K. and Sugimoto M., "Efficient backward and forward pumping cW Raman amplification for InGaAsP laser light in silica fibres". Electronics Letters 1983, Vol 19, 16, p 620).

A major factor in the design of optical fibre commucations systems is the necessity to employ signal repeaters (regenerators) at intervals. If, however, the optical signal can be amplified optically by applying a pump signal to induce stimulated Raman scattering at an end of the link the length of the link between any necessary regenerators can be greatly extended.

The amplification results mentioned above for 1.064 micron and 1.24 micron were based on the use of a pump signal provided by a O-switched YAG (yttrium aluminium garnet) laser and $GeO_2$ doped $SiO_2$ single mode fibres at power levels in the vicinity of a stimulated Raman scattering threshold power of 1.2 W, and 0.5 to 5 W (a forward Raman gain of 45 dB being measured at 2 W), respectively.

We have, however, observed optical amplification in $GeO_2$ doped $SiO_2$ single mode fibre at several discrete wavelengths covering the range 1.12 to 1.356 micron with very much lower pump power levels. Amplification by stimulated Raman emission was obtained using the output from a broad-band Raman fibre laser to provide both a pump to an amplifier and a signal to be amplified.

Figure 1:
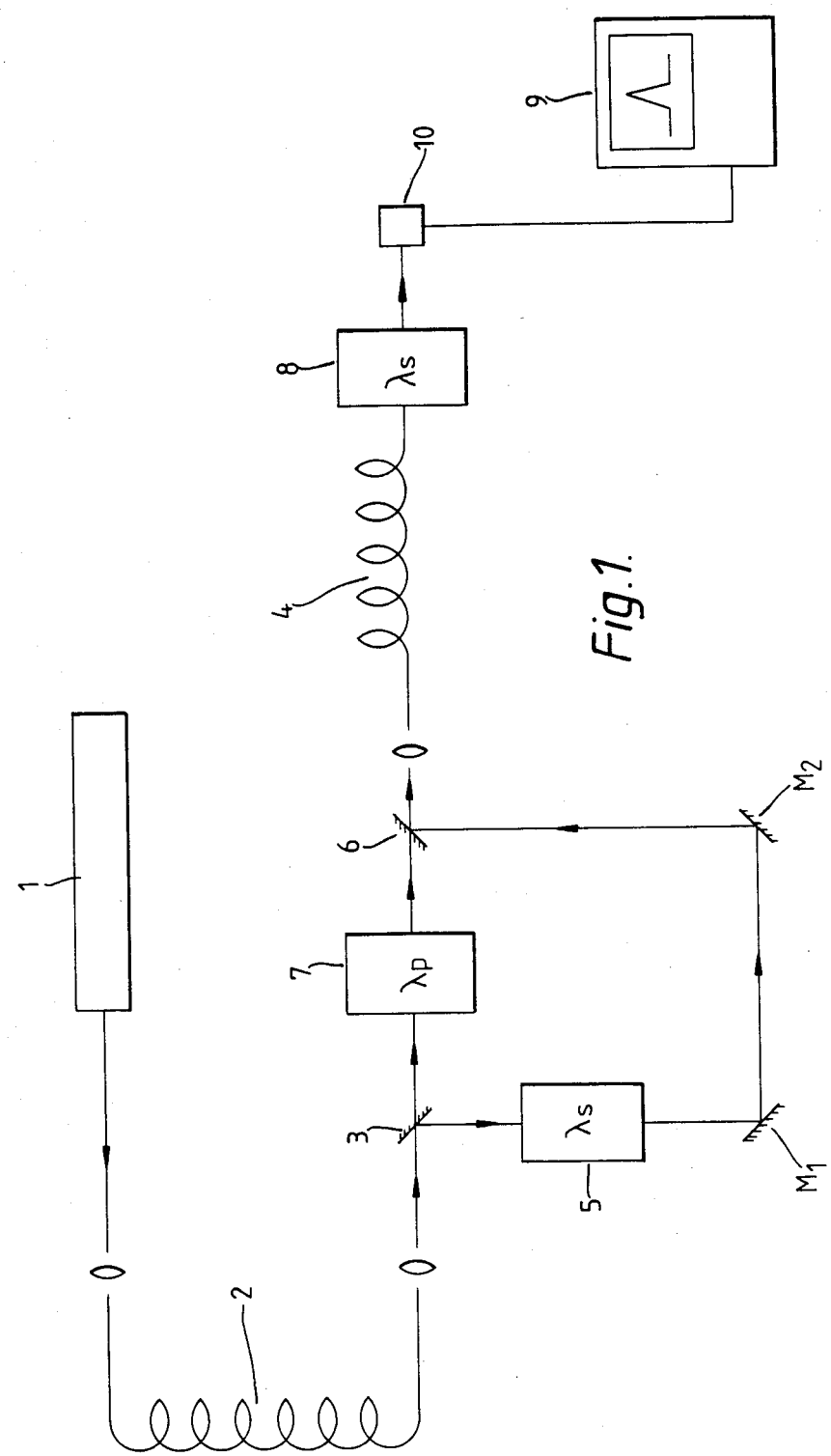
FIG. 1 shows a schematic arrangement of equipment for producing and observing gain in an optical signal.

A schematic arrangement of the equipment employed is shown in FIG. 1. A Q-switched neodymium doped YAG laser 1 emitting at 1.06 micron was employed to pump a Raman fibre laser comprised by a low-loss 80 m length of single mode $GeO_2$ doped $SiO_2$ optical fibre 2 having a core diameter of 5.1 micron and an index difference of $1.3 \times 10^{-2}$. The spectral output from the fibre 2 consisted of five orders of Stokes' emission at wavelengths of 1.12, 1.18, 1.24, 1.30 and 1.36 micron. A small fraction of the output from fibre 2 was split off by an uncoated glass plate 3 to provide a signal for amplification in a second fibre 4. The wavelength $\lambda_s$ of the signal for amplification was selected by a monochromator 5 before being transmitted via an optical path including mirrors $M_1$ and $M_2$, and focussed into amplifier fibre 4 via a second glass plate 6. The wavelength $\lambda_p$ of the pump signal to the amplifier fibre 2 was selected by a monochromator 7. The pump signal and the signal for amplification were synchronously focussed into the amplifier fibre 4. A monochromator 8 coupled to the output end of amplifier fibre 4 was tuned to the signal wavelength $\lambda_s$ and the transmitted pulse observed on an oscilloscope 9 after detection by a germanium avalanche photodiode 10. The amplifier fibre 4 was comprised by a 3 km length of $GeO_2$ doped $SiO_2$ single mode fibre having a core diameter of 8 micron and an index difference of $4.6 \times 10^{-3}$. The loss curve for this fibre is shown in FIG. 2. The minimum attenuation is at 1550 nm (0.27 dB/km), whereas at 1300 nm the attenuation is 0.41 db/km. At 1300 nm, however, the fibre material dispersion reaches zero and there is a very high band width potential at this wavelength. Early transmission studies generally employed wavelengths of the order of 850 nm, which FIG. 2 indicates as having a fibre loss of the order of 2 dB/km, however present studies are based on 1300 or 1500 nm due to the significantly lower loses at these wavelengths.

Using the arrangement illustrated in FIG. 1 gain in the amplifier fibre 4 was observed at all of the Stokes orders emerging from Raman laser fibre 2 by pumping at the wavelength corresponding to the preceding Stokes order. The transmitted pulse was observed with and without the presence of the pump signal. In one case pumping was also performed at a wavelength corresponding to two preceding Stokes orders. Owing to the efficient generation of multiple or Stokes lines in the Raman fibre laser 2, when the stimulated emission threshold is exceeded for each order, power from the preceding order is depleted. However, to observe the maximum gain in the amplified fibre 4 it is necessary to have the maximum power at the pump wavelength $\lambda_p$, thus in the case of use of the lower orders emerging from the fibre 2, which showed strong power depletion, the launch efficiency into the Raman fibre laser 2 was reduced, thereby reducing the conversion to the next order and claiming back the depleted power. The amplification factor of the fibre 4 was defined as the ratio of the output signal pulse with and without the presence of the pump signal. However, with the higher pump power available in the lower orders, and amplified output contained a contribution from stimulated Raman emission due to the pump alone and allowance for this was made in determining the amplification factor. Results obtained are summarised in Table 1.

TABLE 1

| Pump wavelength micron | Signal wavelength micron | Signal amplification dB |
|---|---|---|
| 1.06 | 1.12 | 14 |
| 1.12 | 1.18 | 21 |
| 1.12 | 1.24 | 1.8 |
| 1.18 | 1.24 | 19 |
| 1.24 | 1.30 | 16 |
| 1.30 | 1.36 | 5 |

The lower amplification at a pump wavelength of 1.06 micron was probably due to the extra fibre loss at the wavelength (see FIG. 2), whereas at the longer wavelengths the pump power was much lower giving reduced gain. At the pump wavelength of 1.12 micron the maximum amplification was obtained, whereas when the signal wavelength was adjusted to two Stokes orders away from the pump wavelength of 1.12 micron an amplification of 1.8 dB occurred.

Figure 3:
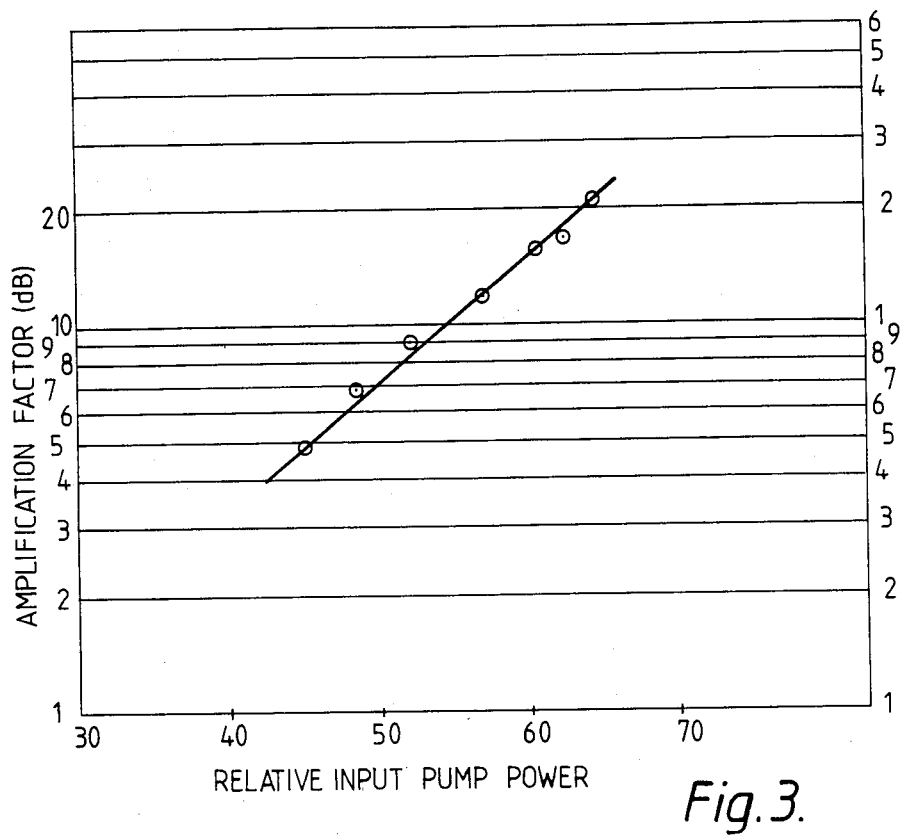
FIG. 3 shows a plot of amplification factor versus input pump power.

To determine that gain saturation had not occurred at the signal wavelength of 1.18 micron where the maximum amplification was observed, the input pump power was varied using an attenuator, and the amplification plotted against amplifier input pump power, see FIG. 3. The plot of FIG. 3 shows no trend towards saturation and much higher gains would, therefore, be expected before saturation is reached, which is confirmed by the 45 dB at 1.24 micron, quoted above, obtained by Desurvire et al. However, the pump power levels we have employed are significantly lower than those employed before and we have still obtained useful amplification factors.

Whereas the above has so far related only to single mode amplifier fibres, we have found that amplification can also be achieved with multimode fibre. For example, in a 500 m length of multimode fibre having a numerical aperture (NA) of 0.3, an amplification of 15 dB was obtained at 1.3 micron wavelength for an input pump power of 140 mW peak.

For reasons of lack of compatibility with existing optical fibre systems and from practical considerations, YAG lasers are not suitable for use as the pumps. However, until now relatively high pump powers were apparently necessary to obtain amplification. We have shown that this is not so. In a particular test, the pump power launched into the amplifier was measured at a pump wavelength of 1.30 micron and an amplification of 5 dB was observed at a signal wavelength of 1.36 micron. The peak power emerging from a short cladding-mode-stripped length of the amplifier was measured using an Anritsu ML93A calibrated power meter and found to be as low as 80 mW. This result means that with optimised launch and drive conditions amplification is possible with pump sources comprised by semiconductor lasers, for example GaInAsP for use in the range 1.0 to 1.8 micron or lead salt for mid I.R. applications.

Now, the amplifier fibre requires, for optimum amplification performance, to have a high Raman cross-section, and a low transmission loss. $GeO_2$ doped $SiO_2$ fibre has a high Raman cross-section (depending on the amount of $GeO_2$ dopant) in comparison with undoped $SiO_2$ fibre, however pure $GeO_2$ fibre has a Raman cross-section ten times higher than undoped $SiO_2$ fibre, although the transmission losses are higher than for undoped $SiO_2$ fibre. In the case of liquid filled fibre employing bromine, the Raman cross-section is 2400 times greater than for undoped $SiO_2$ fibre.

Figure 4:
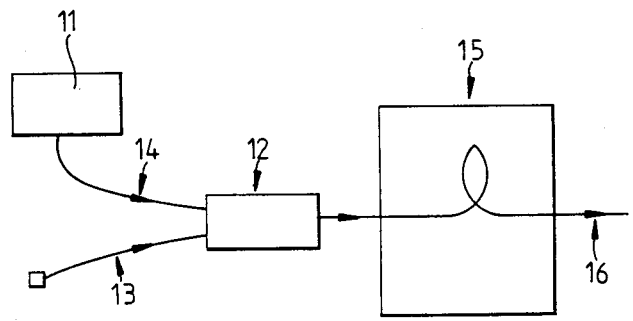
FIG. 4 shows a schematic arrangement of an optical amplifier according to the present invention.

It is thus proposed to construct an optical amplifier with the basic structure illustrated in FIG. 4. It comprises a semiconductor laser 11 with appropriate drive circuitry to provide a pulsed output and used as a pump, a coupler 12 wherein an optical signal 13 to be amplified is coupled with a pump signal 14 output from laser 11 and a length of optical fibre comprising an amplifier fibre 15. The wavelengths ($\lambda_s$) of the signal 13 is, preferably, one Stokes shift away from that of the pump signal 14 ($\lambda_p$). The amplifier fibre 15 is of a length, loss and material appropriate to operating requirements and is designed accordingly. For an undoped $SiO_2$ fibre the signal to be amplified is of the order of 450 $cm^{-1}$ away from the pump signal. The pump signal as applied to the coupler 12 is of a greater power than the signal to be amplified, the materials from which the fibre is made determining the required pump power. The signal 16 output from fibre 15 is signal 13 as amplified.

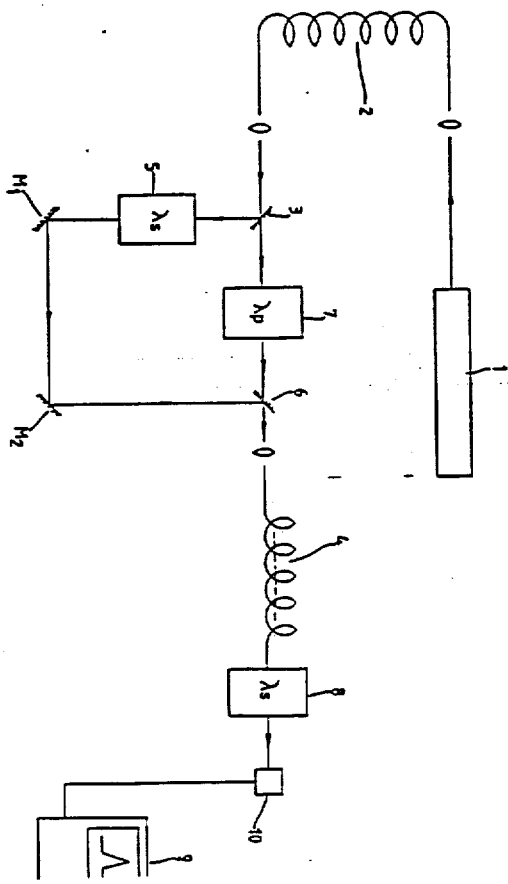

I claim:

1. An optical fibre amplifier comprising a length of optical fibre of high Raman cross-section and low transmission loss; a semiconductor laser and drive means therefor, the output of the semiconductor laser comprising a pulsed pump signal; and coupler means having an input for an optical signal, of a first wavelength, to be amplified, an input for the pump signal and an output coupled to an input end of the optical fibre, and wherein in use the fibre is optically pumped by the pump signal at a second wavelength and gain is obtained at the first wavelength in the signal to be amplified by Raman-Stokes interaction, which first wavelength corresponds to one or more Stokes shift from the pump signal.

2. An optical amplifier as claimed in claim 1, wherein the optical fibre comprises single mode $GeO_2$ doped $SiO_2$ fibre.

3. An optical amplifier as claimed in claim 1, wherein the optical fibre is comprised of pure $GeO_2$.

4. An optical fibre amplifier as claimed in claim 1, wherein the semiconductor laser is comprised by GaInAsP for use in the range 1.0 to 1.8 micron.

5. An optical amplifier as claimed in claim 1, wherein the semiconductor laser is compared by lead salt for mid I.R. applications.

6. A method of amplifying a first optical signal of a first wavelength by Raman-Stokes interaction comprising the steps of generating a pulsed pump signal at a second wavelength by means of a semiconductor laser, and synchronously coupling the first optical signal and the pump signal into a length of optical fibre of high Raman cross-section and low transmission loss, the first wavelength corresponding to one or more Stokes shift from the pump signal wavelength, Raman stimulated emission in the optical fibre serving to induce gain in the first optical signal.

7. A method as claimed in claim 7, wherein the optical fibre is a $GeO_2$ doped $SiO_2$ fibre.

8. A method as claimed in claim 6, wherein the optical fibre is a pure $GeO_2$ fibre.

9. A method as claimed in claim 6, wherein the semiconductor laser is comprised by GaInAsP.

* * * * *

UNITED STATES PATENT AND TRADEMARK OFFICE
CERTIFICATE OF CORRECTION

PATENT NO. : 4,720,684
DATED : January 19, 1988
INVENTOR(S) : Byron et al

It is certified that error appears in the above-identified patent and that said Letters Patent is hereby corrected as shown below:

Claim 7, line 4, "7" should be --6--

Signed and Sealed this

Twenty-eighth Day of March, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,720,684

DATED : January 19, 1988

INVENTOR(S) : Kevin C. Byron

It is certified that error appears in the above-identified patent and that said Letters Patent is hereby corrected as shown below:

Title page should be deleted to appear as per attached title page.

Signed and Sealed this

Twenty-third Day of May, 1989

Attest:

DONALD J. QUIGG

Attesting Officer

Commissioner of Patents and Trademarks

United States Patent
Byron

[11] Patent Number: 4,720,684
[45] Date of Patent: Jan. 19, 1988

[54] OPTICAL AMPLIFIER

[75] Inventor: Kevin C. Byron, Bishops Stortford, United Kingdom

[73] Assignee: Standard Telephones and Cables plc, London, England

[21] Appl. No.: 888,274

[22] Filed: Jul. 22, 1986

Related U.S. Application Data

[63] Continuation of Ser. No. 679,444, Dec. 7, 1984, abandoned.

[30] Foreign Application Priority Data

Dec. 16, 1983 [GB] United Kingdom ........... 83 33610

[51] Int. Cl.⁴ .................. H07F 7/00; H04B 9/00
[52] U.S. Cl. .................. 330/4.3; 307/426; 455/612
[58] Field of Search .................. 372/9, 75

[56] References Cited

U.S. PATENT DOCUMENTS

| | | | |
|---|---|---|---|
| 3,290,539 | 12/1966 | Lamorte | 372/75 |
| 3,705,992 | 12/1972 | Ippen et al. | 455/610 |
| 3,873,825 | 3/1975 | Jones et al. | 455/610 |
| 4,389,617 | 6/1983 | Kurnit | 330/4.3 |
| 4,394,623 | 7/1983 | Kurnit | 330/4.3 |
| 4,401,364 | 8/1983 | Mochizuki | 350/96.16 |
| 4,515,431 | 5/1985 | Shaw et al. | 350/96.15 |

FOREIGN PATENT DOCUMENTS 2116391 9/1983 United Kingdom.
2077909 6/1984 United Kingdom.

Primary Examiner—Nelson Moskowitz
Attorney, Agent, or Firm—Kerkam, Stowell, Kondracki & Clarke

[57] ABSTRACT

Use is made of stimulated Raman emission to induce gain in an optical signal (13) of a first wavelength. The optical signal (13) and a pump signal (14) are synchronously coupled to a length of optical fibre (15). The pump signal is at a second wavelength. The first wavelength corresponds to one Stokes shift from the pump signal. The pump signal is generated by a semiconductor laser (11) and thus only relatively low pump powers are involved in comparison with the conventional use of YAG lasers as the pumps, however significant gain is achieved despite the low pump powers. Preferably the optical fibre (15) has a high Raman cross-section and a low transmission loss, for example $GeO_2$ doped $SiO_2$ or pure $GeO_2$.

9 Claims, 4 Drawing Figures